US007911618B2

(12) United States Patent
Redko et al.

(10) Patent No.: US 7,911,618 B2
(45) Date of Patent: Mar. 22, 2011

(54) HOLOGRAPHIC INTERFEROMETRY FOR NON-DESTRUCTIVE TESTING OF POWER SOURCES

(75) Inventors: Volodymyr Redko, Coral Springs, FL (US); Elena M. Shembel, Coral Springs, FL (US); Yurii V. Sokhach, Dnepropetrovsk (UA); Olexandr Kudrevatykh, Dnepropetrovsk (UA)

(73) Assignee: Enerize Corporation, Coral Springs, FL (US)

( * ) Notice: Subject to any disclaimer, the term of this patent is extended or adjusted under 35 U.S.C. 154(b) by 106 days.

(21) Appl. No.: 12/152,740

(22) Filed: May 16, 2008

(65) Prior Publication Data

US 2008/0291458 A1 Nov. 27, 2008

Related U.S. Application Data

(60) Provisional application No. 60/930,601, filed on May 17, 2007.

(51) Int. Cl.
*G01B 9/21* (2006.01)
(52) U.S. Cl. ...................................................... 356/457
(58) Field of Classification Search .................. 356/457, 356/604, 605
See application file for complete search history.

(56) References Cited

U.S. PATENT DOCUMENTS

| 3,545,259 | A | * | 12/1970 | Grant | 73/573 |
| 3,681,970 | A | * | 8/1972 | Wells | 374/5 |
| 4,103,168 | A | * | 7/1978 | Sturrock et al. | 250/442.11 |
| 4,139,302 | A | * | 2/1979 | Hung et al. | 356/32 |
| 4,392,745 | A | * | 7/1983 | Wright et al. | 356/458 |
| 4,702,594 | A | * | 10/1987 | Grant | 356/35.5 |
| 7,148,969 | B2 | * | 12/2006 | Thomas et al. | 356/484 |
| 7,400,411 | B2 | * | 7/2008 | Pfaff | 356/503 |
| 7,420,687 | B2 | * | 9/2008 | Pfaff | 356/457 |
| 7,542,186 | B2 | * | 6/2009 | Misawa et al. | 359/3 |

* cited by examiner

*Primary Examiner* — Tarifur Chowdhury
*Assistant Examiner* — Jonathon D Cook
(74) *Attorney, Agent, or Firm* — Michael G. Shariff, Esq.; Inventa Capital PLC

(57) ABSTRACT

The present invention is connected with the holographic interferometry method and device that provides, to a very high precision, the reconstructing the original waveform of light emitted or reflected by an object. This method allows image resolution close to that of the wavelength of the light being used. The non-destructive method of holographic interferometry coupled with impulse heating of the test article to allow observation of its dynamic response to operating conditions, as described herein, is one of the most effective non-contact automated quality control methods available.

12 Claims, 17 Drawing Sheets

1.

2.

3.

4.

5.

6.

HOLOGRAPHIC INTERFEROMETRY FOR NON-DESTRUCTIVE TESTING OF POWER SOURCES

CROSS-REFERENCE TO RELATED APPLICATIONS

Claims priority of Provisional Patent Application No. 60/930,601.
Filed May 17, 2007

FEDERALLY SPONSORED RESEARCH

None

SEQUENCE LISTING

None

FIELD OF THE INVENTION

The present invention relates to electrical engineering, and in particular to the field of physical non-destructive, testing of energy generating and storage device components during and after manufacture, and can be used to determine defects in batteries, supercapacitors, solar cells and fuel cells, and especially in thermal batteries and solid oxide fuel cells.

BACKGROUND OF THE INVENTION

In multi-component structures such as those that comprise energy generation and storage devices such as batteries, supercapacitors, fuel cells, solar cells, and the like, components with defects or abnormal features or flaws can adversely affect the properties of the assembled device. As a result, the performance and service life of such devices can be significantly reduced (for example, by degraded capacity). Such defective devices often fail prematurely. Quality control of battery components is especially important since these devices are increasingly used to power expensive mission critical equipment.

Holographic interferometry is a method of reconstructing to a very high precision the original waveform of light emitted or reflected by an object. This method allows image resolution close to that of the wavelength of the light being used. The non-destructive method of holographic interferometry coupled with impulse heating of the test article to allow observation of its dynamic response to operating conditions, as described below, is the one of most effective non-contact automated quality control methods available.

To perform holographic interferometry, the most common technique is to allow coherent light (such as laser light) to fall on an object. The reflected light is then combined with a reference beam of the original light to produce an interference pattern that projected onto a piece of film, or recorded by a CCD (charge-coupled device) and read into a computer. By passing a beam of the same wavelength as the beam used to record the hologram, the image thus obtained may be re-projected.

Holographic interferometry was first used to study fluid flow around objects of varying profiles (see Tim McIntyre's introduction). After passing the laser beam through a splitter, one beam of the laser light is passed through the flow to be studied, and the other beam is diverted around the flow chamber. The two beams are then re-combined in the manner described above; producing an interference pattern from which the forms of the fluid flow may be reconstructed.

The method has several advantages, one of these being that it can determine the response of a device to the kinds of changes in environmental or operating conditions that can indicate flaws or defects that may not be apparent in more standardized tests. For example, and as described below as an advantage of the present invention, the method of holographic interferometry can precisely determine the physical response of battery electrodes to small temperature changes. Such a response can indicate whether the battery electrode is properly formed and installed into the battery.

BRIEF SUMMARY OF THE INVENTION

The non-destructive method of holographic interferometry as described below is a precise and effective method and tool for automated non-contact quality control.

Holographic Interferometer is designed for determination of through and non-through the-thickness cracks and foreign inclusions, heterogeneousness of mechanical characteristics and the thickness irregularity of electrode plates and solid electrolytes of the thermal batteries by holographic interferometry method.

One objective of the present invention is to evaluate the homogeneity and isotropy for thin ring-shaped electrodes and associated solid electrolyte. Holographic interferometry with local thermal loading of the sample was developed to assess electrode homogeneity and quality.

The purpose is to investigate the effectiveness of various types of thermal loading of electrodes in the process of holographic flaw detection.

The main objectives of the invention are:
1. To determine a suitable source for the thermal loading of electrodes,
2. To select a method for providing thermal loading of electrodes on their surface limited by a specified contour,
3. To produce holographic interference portraits of the electrode surface under different types of thermal loading.
4. To make an analysis of the obtained results.

In the course of developing the method and apparatus of the present invention, the following types of the thermal loading sources were studied:
incandescent lamps
a stream of hot air
a contact heat transfer from a preliminary heated body
infrared lamps.

By means of optical lenses and a system of masks we have shown that it is possible to provide both a uniform heating of the whole electrode surface and a uniform circular heating close to its inner or outer contour. A general view of the apparatus used to achieve and apply these heating modes is shown in FIG. 1.

DETAILED DESCRIPTION OF THE INVENTION

The present invention comprises the following steps. By means of holographic interferometer, holograms of the initial state of component's surface (the plates of anode, cathode or electrolyte the thermal batteries) are recorded and sent to a computer for storage and analysis.

The optical system is designed to create the extra-axial holographic scheme. The system consists of optical elements, (mirror, lens, optical wedge) secured by fastening devices mounted on a vibration free table, and allows for the adjustments of the optical elements.

Figure 14:
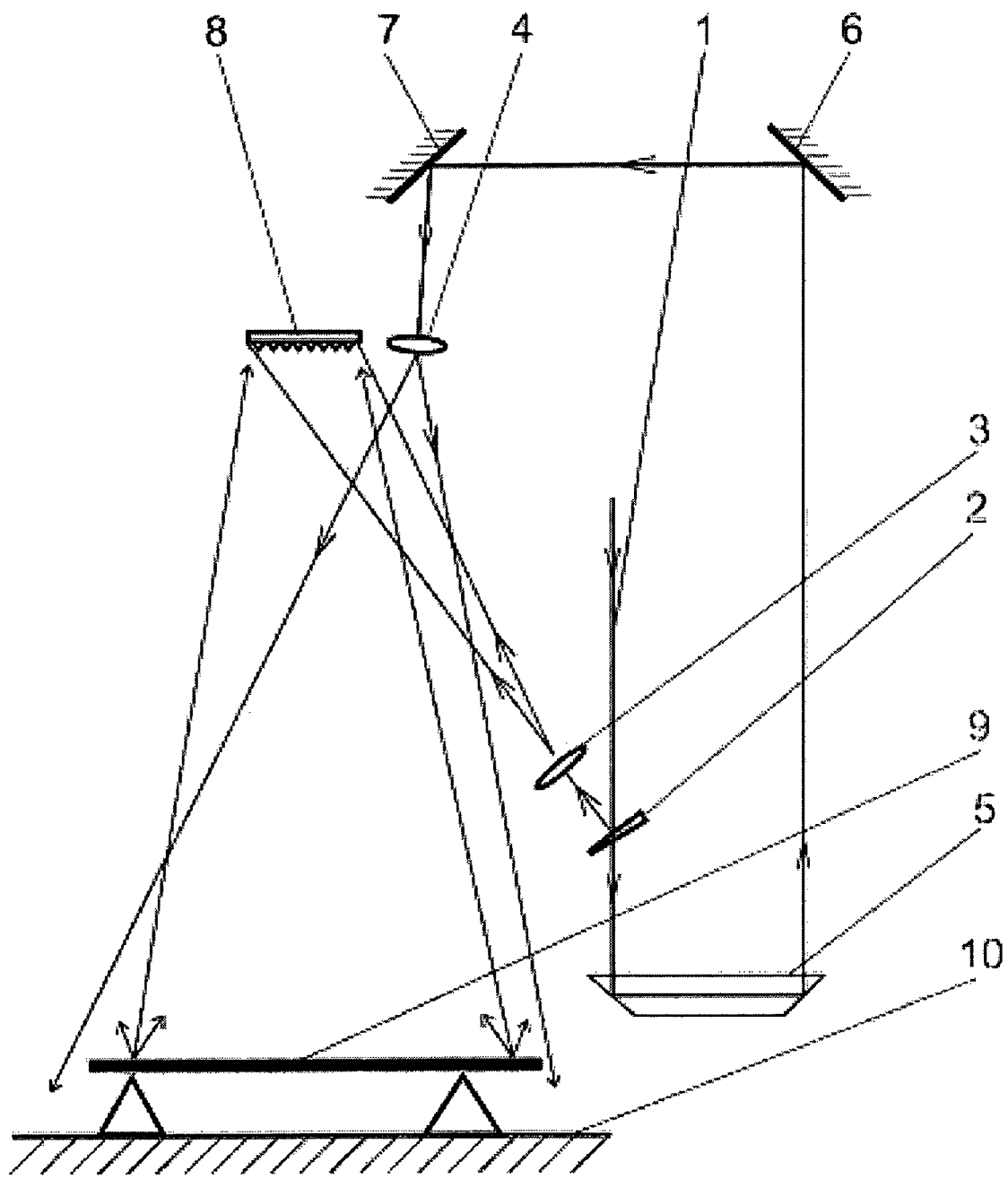
FIG. 14 shows the path of the laser beam in the optical system where 1 is the laser beam, 2 is the optical wedge, 3 and 4 are lenses, 5 is prism, 6 and 7 are mirrors, 8 is the recording cell, 9 is the test article and 10 is the vibration free table.
Figure 15:
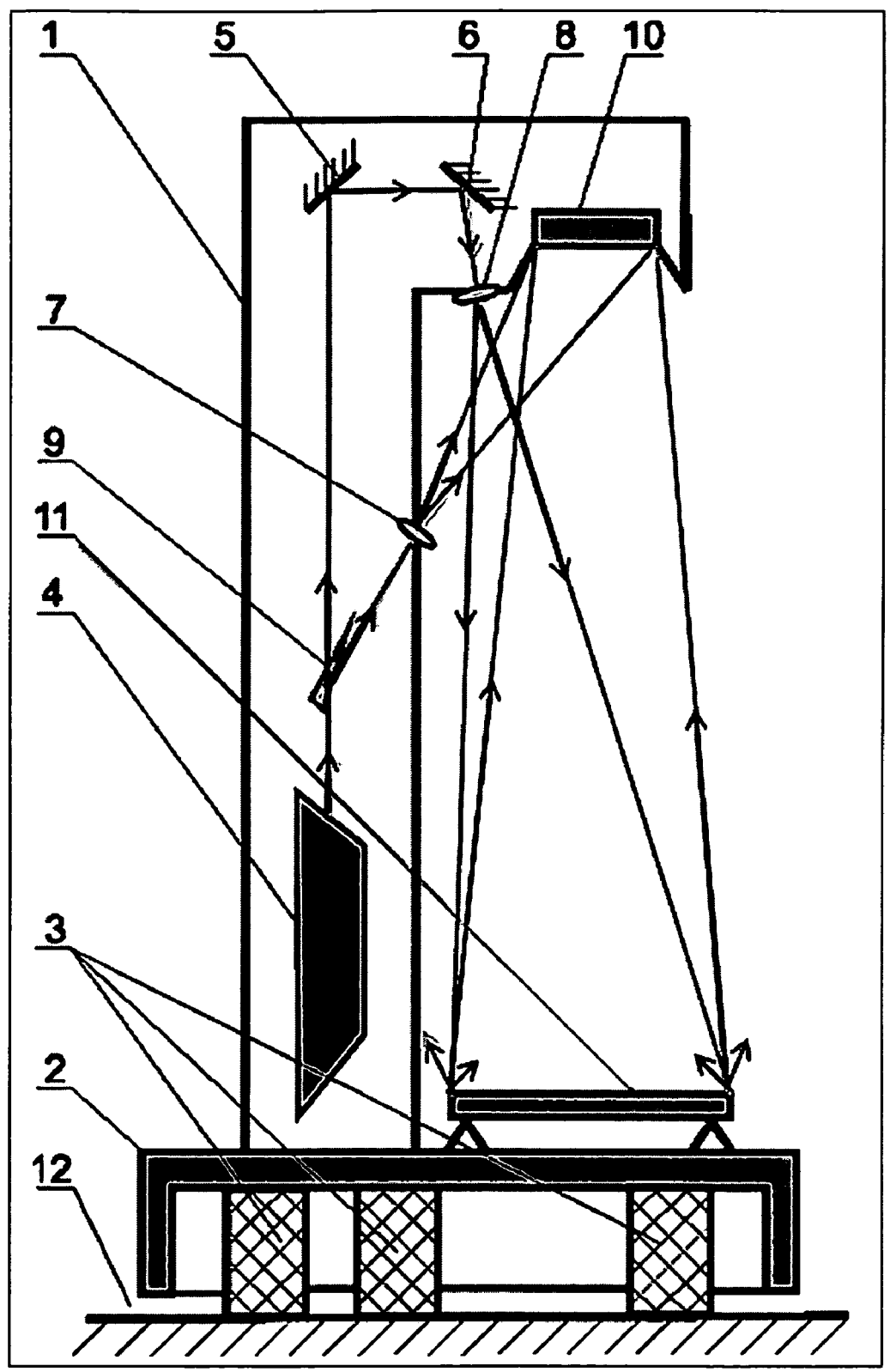
FIG. 15 shows the design of the holographic interferometry device where 1 is the optical rack, 2 is the subject table, 3 is the elastic shock is the absorbers, 4 is the laser, optical elements 5, 6 are mirrors, 7 and 8 are lenses, 9 is the optical wedge, and 10 is the photo registration unit.

The system works as follows. (FIG. 14). The laser beam 1 by help of an optical wedge 2 is divided into two beams. The first beam (subject) after reflection from prism 5 and mirrors 6 and 7 by help of lenses 3 and 4 will be transformed into a wide bunch which after reflection from tested object 9 gets on the recording cell 9. The second beam (basic) after reflection from the mirrors 6, 7 extends with the lens 5 and gets on a recording cell 9. Fastening devices of optical elements provide their rigid fastening on a vibration free optical table 10, and also the possibility of adjusting operations.

As the laser in the interferometer could be a diode-pumped solid-state one-mode laser KLM-532/SLN-30 (DPSS) with a green spectral range ($\lambda$=532 v$\mu$) with capacity of radiation from 0 to 30 m Wt. Laser power is 220 V, AC.@ 50 Hz. The laser has the management console with a capacity control knob and radiator.

Figure 16:
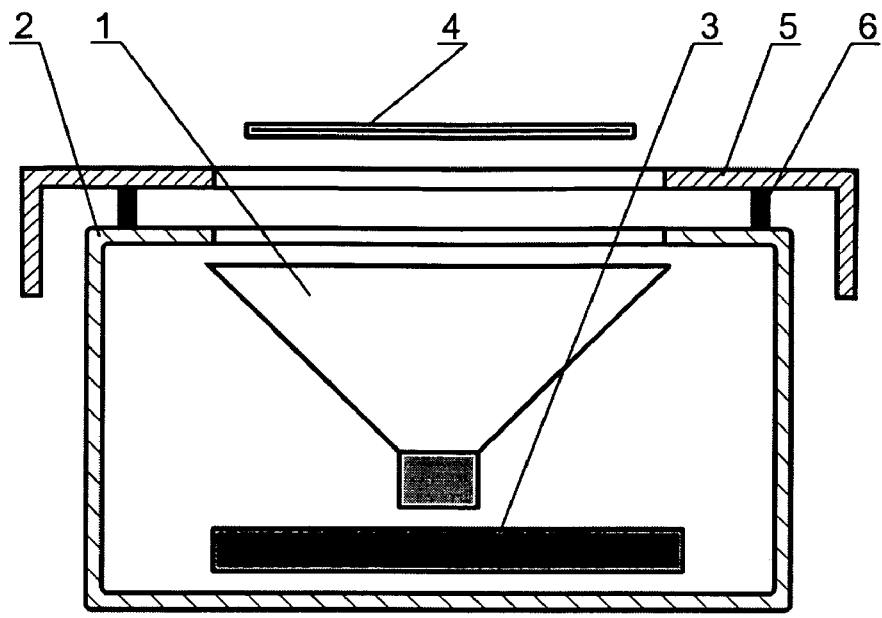
FIG. 16 shows the scheme of the heating device where 1 is the IR-lamp, 2 is the case for samples, 3 is the fan, 4 is the test article, 5 is the vibration damping table, and 6 is the damper.

The active element of the heated device (FIG. 16) is the infra-red lamp 1 placed in the special case 2. The interferometer case has a fan to reduce heat 3.

Figure 17:
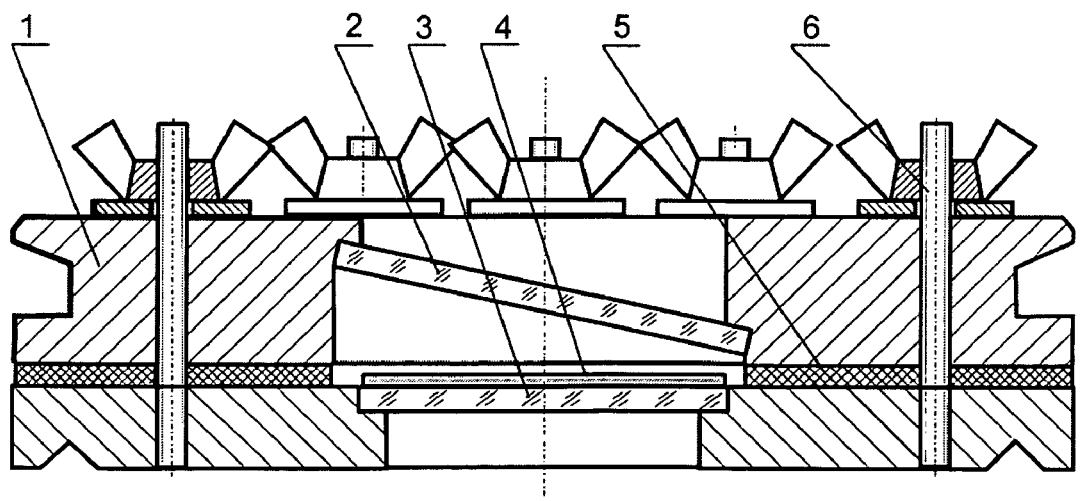
FIG. 17 shows the scheme of for mounting the test article in the case or enclosure where 1 is the demountable case, 2 and 3 are glass plates, 4 is the test article, 5 is an elastic lining, and 6 is the bolted-on connector.
Figure 18:
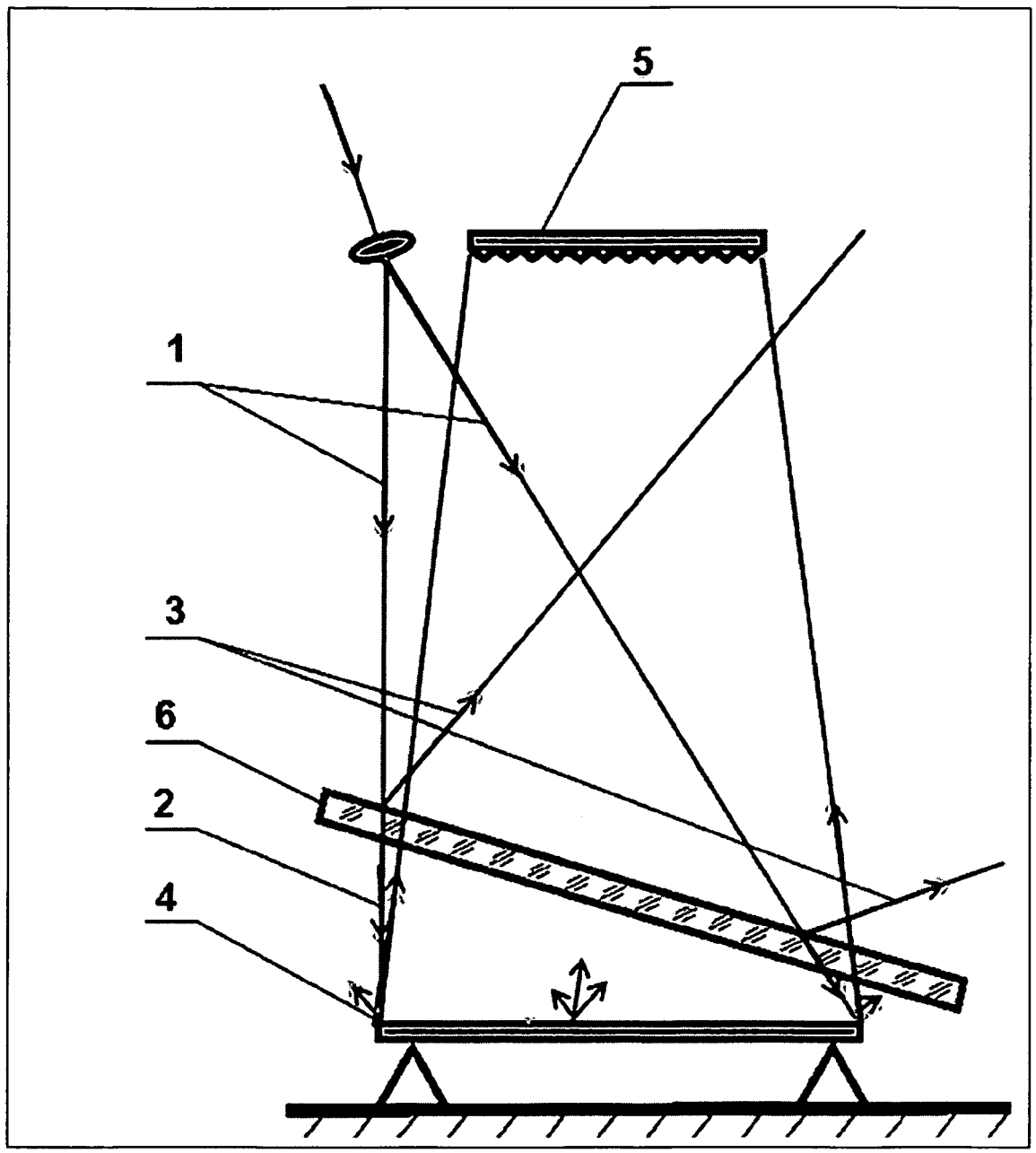
FIG. 18 shows the scheme of the reflection from the inclined glass where 1 is the—laser beam, 2. is the beam after it is refracted, 3 is the parasitic reflected beam, 4 is the test article, 5 is the unit for registration, 6 is the top glass that covers the box.
Figure 19:
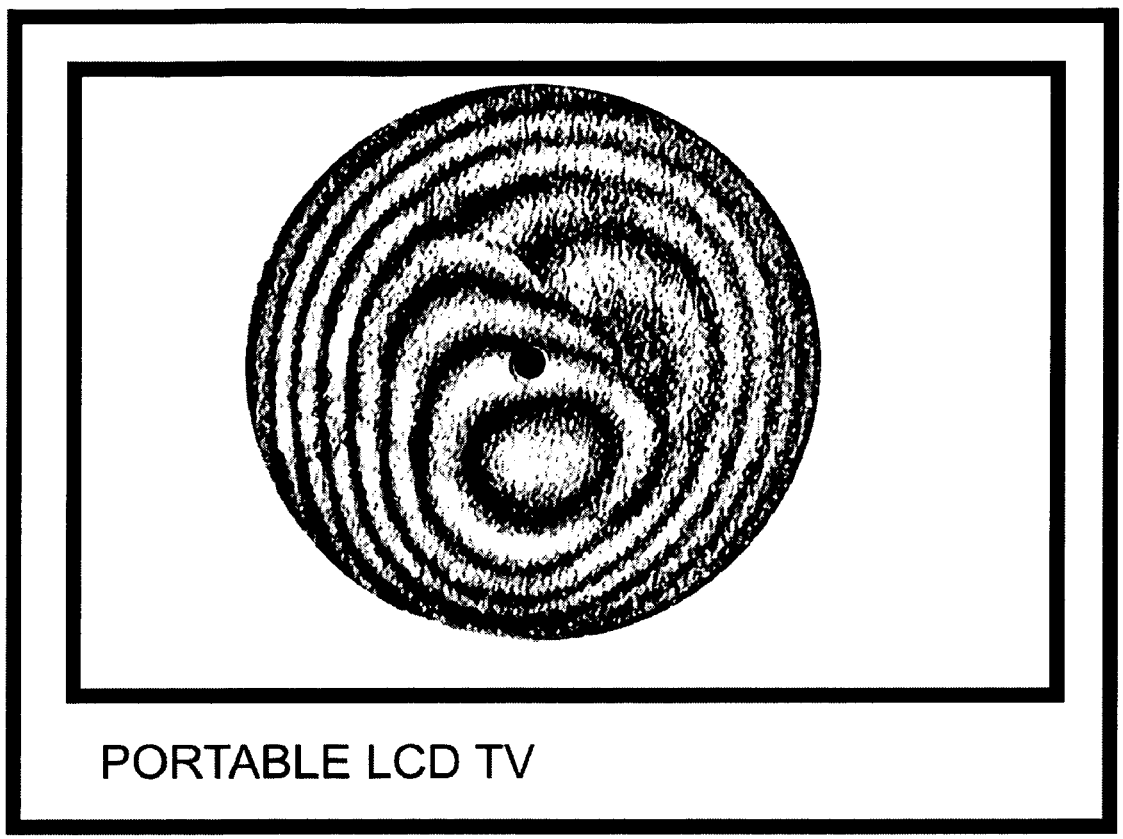
FIG. 19 shows the monitor with hologram of the test articles.
Figure 20:
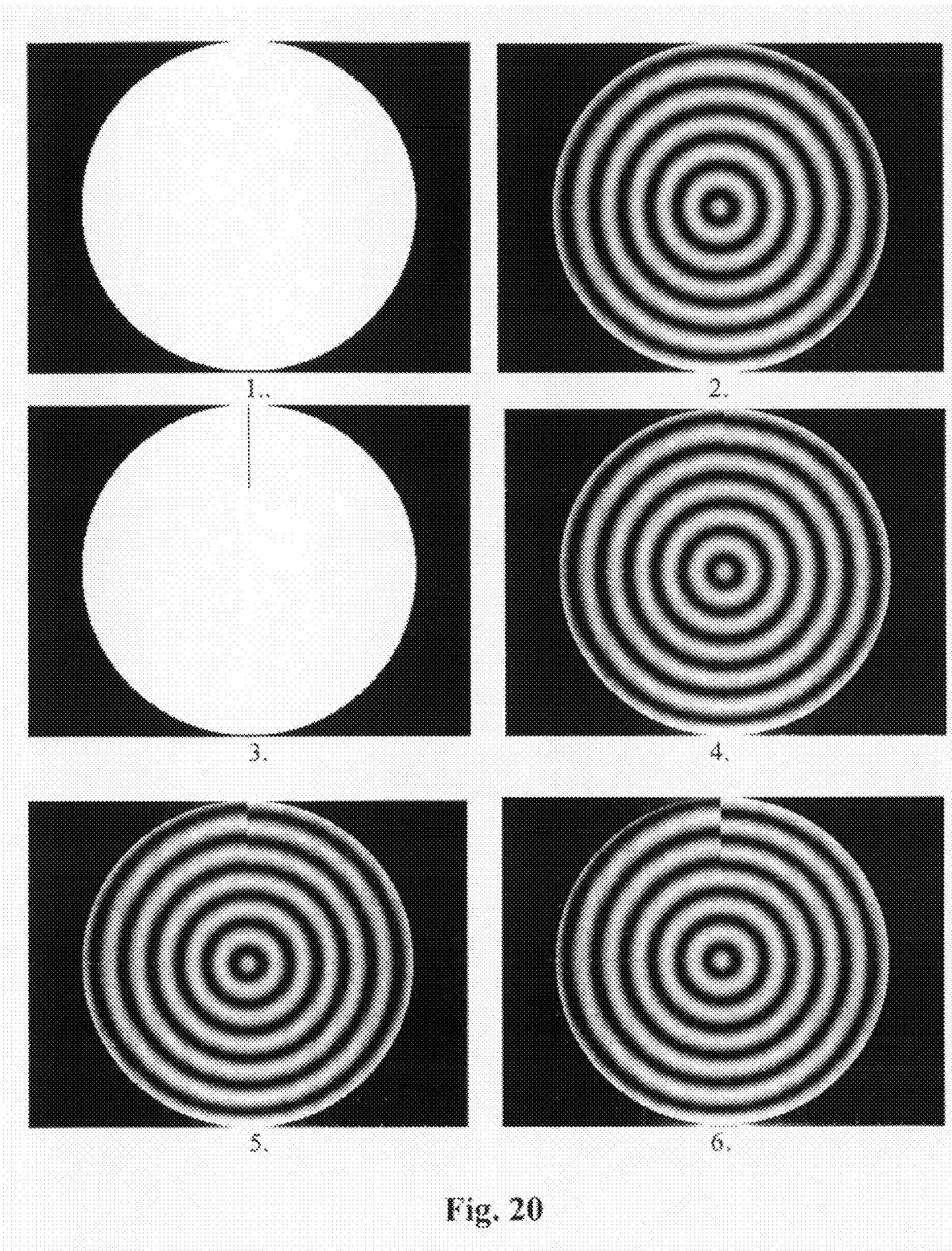
FIG. 20 shows the results from a hologram of a plate with the radial crack defects where 1 is the sample without defects, 2 is the interferogram of the sample without defects, 3 is the position of a crack in the test article, 4 is the interferogram of the test article wherein the maximum mutual displacement of the lines indicating a crack equal to 0.035 micron, 5 is the interferogram of test article wherein the maximum mutual displacement of the lines indicating a crack equal 0.07 micron, 6 is the interferogram a test article wherein the maximum mutual displacement of the lines indicate cracks equal 0.14 micron
Figure 21:
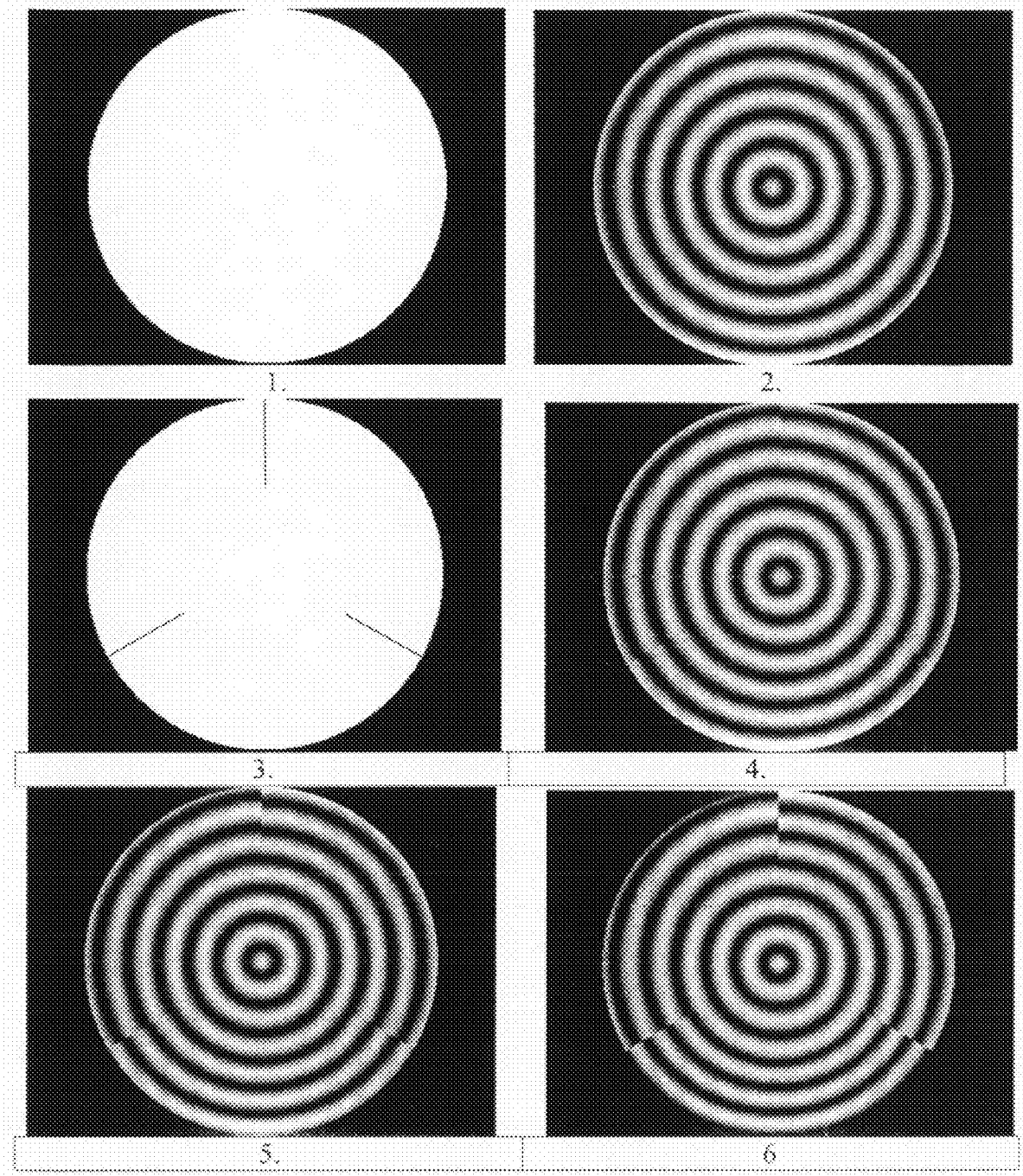
FIG. 21 shows the results from a hologram of a plate with three radial crack defects where 1 is the test article without defects, 2 is the interferogram of the test article without defects, 3 is the position of the crack in the test article, 4 is the interferogram of a test article wherein the maximum mutual displacement of the lines of the crack equals 0.035 micron, 5 is the interferogram of the test article wherein the maximum mutual displacement of the lines indicating a crack equals 0.07 micron, 6 is the interferogram of test article wherein the maximum mutual displacement of the lines indicate cracks that are equal to 0.14 microns.
Figure 22:
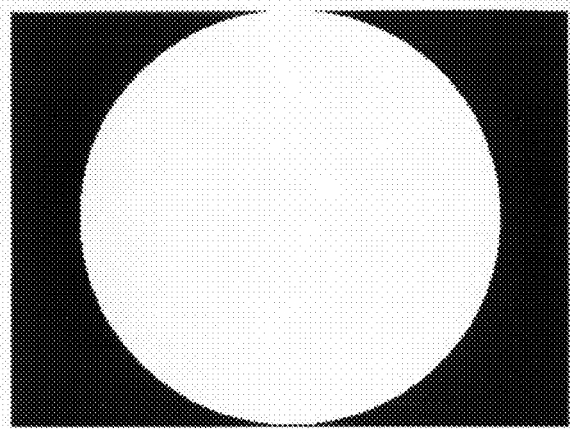
FIG. 22 shows the results of the hologram of a plate with arbitrary crack defects where 1 is the test article without defects, 2 is the interferogram of a test article without defects, 3 is the position of the crack in the test article, 4 is the interferogram of a test article wherein the maximum mutual displacement of the lines of the crack equal 0.035 micron, 5 is the interferogram of a test article wherein the maximum mutual displacement of the lines indicating a crack equal 0.07 micron, 6 is the interferogram a test article wherein the maximum mutual displacement of the lines indicate cracks equal to 0.14 microns.
Figure 22:
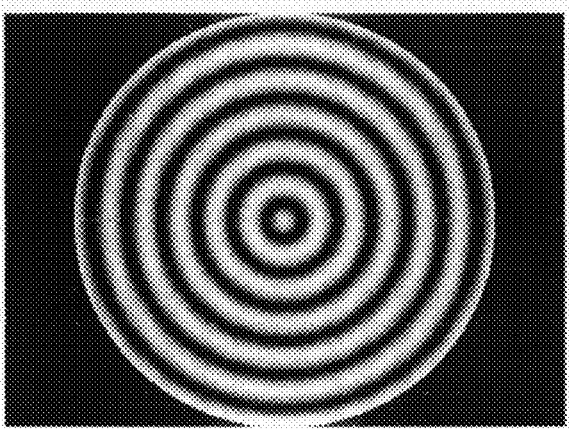
Figure 22:
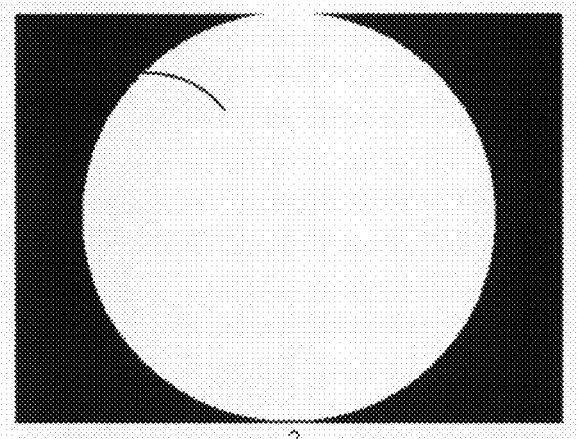
Figure 22:
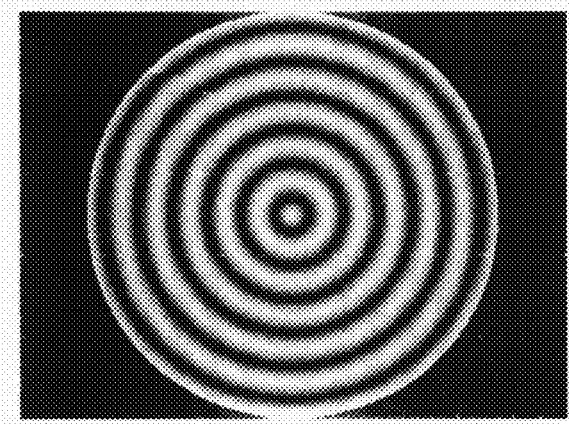
Figure 22:
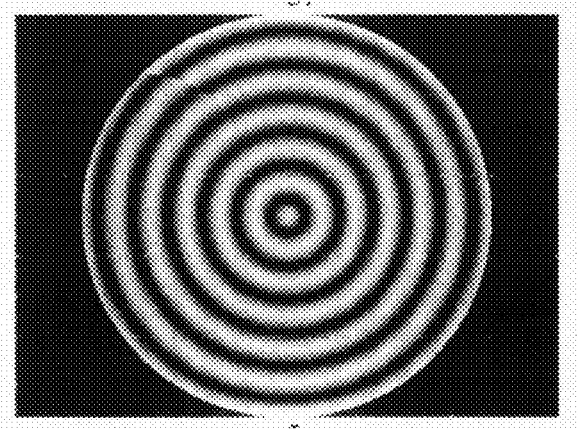
Figure 22:
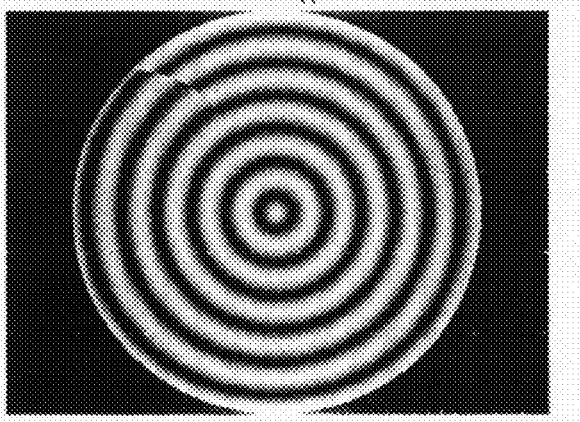

The fastening device (FIG. 17) for the subject consists of the demountable metal case 1 having two transparent windows 2, 3. Through window 2 the hologram recording of the subject 4 is made, through window 3, its heating is made. The top and bottom parts of the case 1 incorporate through an elastic lining 5 with the bolted-on connections 6.

The system of recording of holograms is intended for recording of holograms in real time with possibility of repeated recording and information deleting. It consists of a control console and a recording cell.

Visualization of the hologram of the subject is carried out by means of a television chamber which removes the information from the recording cell and in real time transfers it to a TV.

The method consists of making a hologram recording of the surface of the subject using the real time holographic registration system Then heat the subject $\Delta T$ and observe the subjects interferogram in the monitor in real time.

Thus the operator sees formation of the interference fringes and dynamics of their development with growth of temperature of the subject from reference value $T_0$ to temperature $T_0 + \Delta T$.

After the termination of heating the subject cools down and the interference fringes on the interferogram of the subject, smoothly changing, disappear. When the subject temperature accepts reference value $T_0$, in case of absence of irreversible deformations instead of interferogram the operator will observe only the subject's hologram which means that the interference fringes completely will disappear.

Interference fringes that are observed in the course of heating of the subject, in some approach, represent lines of equal temperature moves of a surface of the subject. These moves have size, commensurable with length of a wave of radiation of the laser, which are the tenth shares and units of micrometers. Transition from the one interference fringes to the next corresponds to change of moves in corresponding points on size about 0, 2 microns.

Presence in the subject of defects like, types of cracks, foreign impurities, changes of physical mechanical and geometrical characteristics leads to that the field of moves of its surface under identical conditions of the temperature and registration interferogram differs from moves for ideal (defect less) object. Very high sensitivity of an arrangement the interference fringes to moves of a testing surface leads to that the operator can observe easily visually difference in an arrangement of fringes on tested subject in comparison with ideal (defect less). The arrangement form of the interference fringes for defect less subject can be received or settlement by, or hologram recording by obviously defect less subject.

Objects of the testing considered in a given technique represent axial-symmetric structure in the geometrical plan and under physic-mechanical characteristics. Therefore at axial-symmetric heating of object and by using axial-symmetric schemes of registration of hologram on real-time interferogram for ideal objects of the testing interference fringes should be close to coaxial circles. Their quantity is defined by heating temperature. If there are cracks, foreign impurities in object of the testing or it's thickness changes, axial symmetry of the interference fringes is broken. Presence of cracks and foreign impurities leads to rupture or sharp change of curvature of the interference fringes. Presence of smooth change of a thickness (wedge-shape) leads to change of density and infringement of the axial-symmetry of the interference fringes.

The analysis of results of the testing and the general data on the form of the interference fringes are as follow. Objects of the testing considered in a given technique represent axial-symmetric structure in the geometrical plan and under physic-mechanical characteristics. Therefore at axial-symmetric heating of object and by using axial-symmetric schemes of registration of hologram on real-time interferogram for ideal objects of the testing interference fringes should be close to coaxial circles. Their quantity is defined by heating temperature. If there are cracks, foreign impurities in object of the testing or it's thickness changes, axial symmetry of the interference fringes is broken. Presence of cracks and foreign impurities leads to rupture or sharp change of curvature of the interference fringes. Presence of smooth change of a thickness (wedge-shape) leads to change of density and infringement of the axial-symmetry of the interference fringes.

Then the test article or sample (for example, a disk-shaped electrode component) is evenly and instantaneously impulse-loaded by heating along its external radius by infrared or laser irradiation.

A more detailed description of the invention is provided by using the example of a test article comprising a disk shaped plate with the hole in the center. Three different schemes of samples loading by temperature are possible:

the uniform heating of its inner contour around of hole.
the uniform circular heating of its outer contour
the uniform heating of the whole surface simultaneously.

The power of the irradiation used is depended on the properties of the material to be heated. For example, for the anode of thermal batteries, the power would be one suitable value. The power used to heat the cathode may be another suitable value, and the power used to heat the plate of solid electrolyte could be a third suitable value. In the case of thermal batteries, these parameters are determined experimentally for each thermal battery component design. By means of optical lenses and a system of masks it is possible to provide both a uniform heating of the whole electrode surface and a uniform circular heating close to its inner or outer contour or surface.

In the some case the samples of the electrode and solid electrolyte were placed in a transparent container that was filled with argon. Then the sample was exposed to local heating by 1 to 2 degrees near the inner opening. Under the influence of thermal loading there occurred temperature-induced deformations of the sample. These deformations were registered by the non-contact method of holographic interferometry.

After a period of heating (for example $T \approx 1.5$ seconds) a hologram of the heat loaded component surface is recorded and the recorded information sent to a computer. Time T depends on the power of infrared or laser irradiator, thermal conductivity of the test article component material or structure of interest and its geometric size, and is determined by preliminary study in the course of development of control technique to be used.

Appearance of 10 to 15 interference bands on the interference portrait serves as criterion for the correct amount of irradiation energy or power, and irradiation time. Time duration for the various components of interest depends on the rate of propagation of the thermal front.

The sensitivity of the method used can allow detection of dimensional changes or displacements of as little as 0.03 microns. Results of the measurement are visually assessed according to the distribution of interference bands on the surface of the sample.

If a sample is homogeneous and isotropic, then lines in the pattern display a gradually changing curvature. If there are heterogeneities, these show up as local drastic changes in interference band curvature. If necessary, visual control based on the method of holographic interferometry can be automated.

Using software, two holograms (initial and loaded state) are added to one another and "interference portrait" of the controlled component (test article) is obtained. Then using specific algorithms, interference band shapes are analyzed (in manual mode it is done by the operator) as to the presence of sections of the controlled component that are characterized by abrupt change in interference band curvature. The screening criterion or condition for distinguishing between high-quality controlled components and defective components is set by specification. The process can be automated.

In an automated configuration on a conveyor assembly line for example, a signal is sent from the analysis unit to an executive mechanism. As a result, a given component either passes through for assembly or, if it has inadmissible flaws, is rejected from the conveyor. All operations are executed in a specially designed box in an inert atmosphere (for example, in an argon atmosphere).

The holographic interference portraits were recorded in real time by using a photo-thermoplastic recorder. Thus, a hologram of the heated object was obtained, whereupon, while watching through the cell of a photo-thermoplastic device the movement of the interference bands on the electrode surface, the distribution of the bands was recorded and transmitted into the computer by means of a digital camera. The use of the real time method permitted selection of heating times for which the density of the interference bands was optimal.

All the three of the above described methods of applying the thermal load yield similar results. That is, the defects on the electrode being studied were detected in all cases. In contrast to the local heating that had been used earlier, the axially symmetric methods of heating permitted detection of a defect on one of the electrodes in the form of a crack propagating to the outer contour of the electrode. This is evident in FIG. 2.5 as a sharp change of the curvature of the interference bands. This indicates that the thermo-mechanical properties of the electrode in this location differ from the properties in other locations, while the discontinuities of the interference bands indicate the presence of a crack in a given location.

Figure 6:
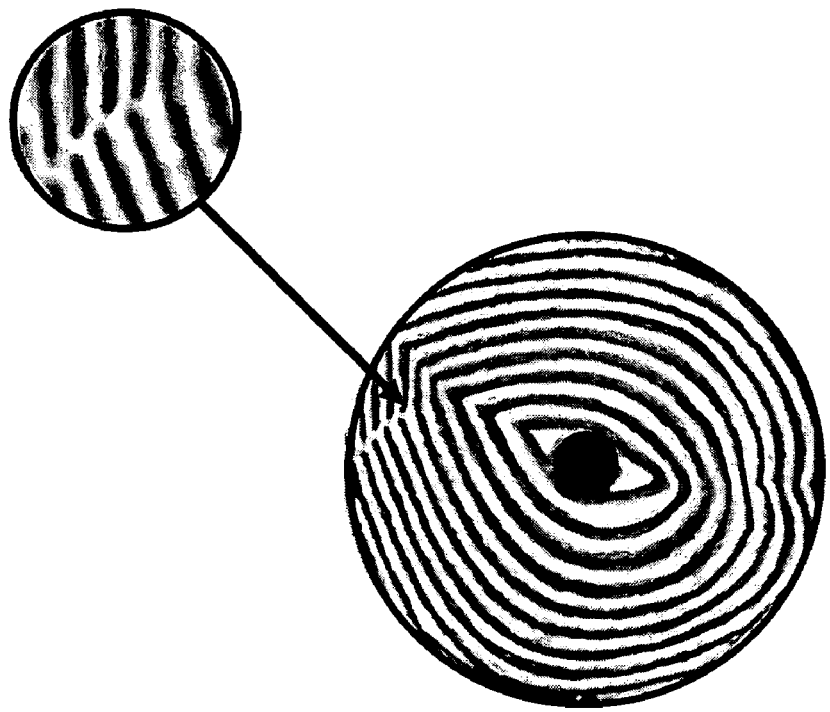
FIG. 6 shows an interference pattern portrait of the electrode during uniform heating of the whole surface. The location of a detected crack is indicated and is separated

The use of the axially symmetric method of thermal loading, on an isotropic uniform metallic plate of geometric dimensions identical of those of the electrode, yielded much better results in comparison to local loading. On an equally loaded reference electrode, the axially symmetric interference bands to be observed will be identical to those that are shown in FIG. 6, thus the process of rejecting faulty articles becomes much simpler.

Figure 7:
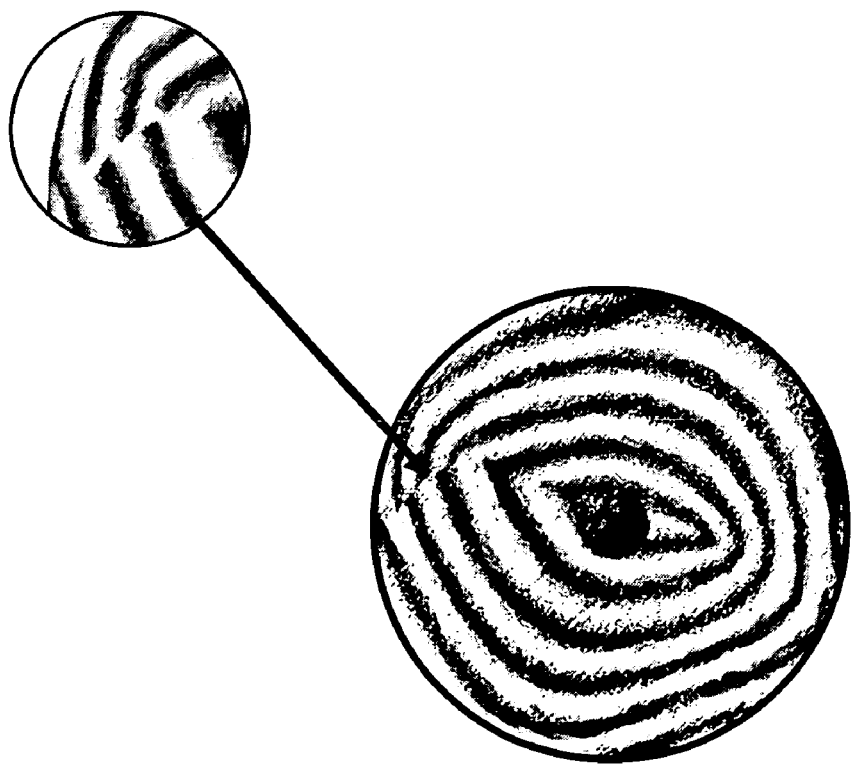
FIG. 7 shows an interference pattern portrait of the electrode during uniform circular heating on its outer contour. The portion with the crack is separated.
Figure 8:
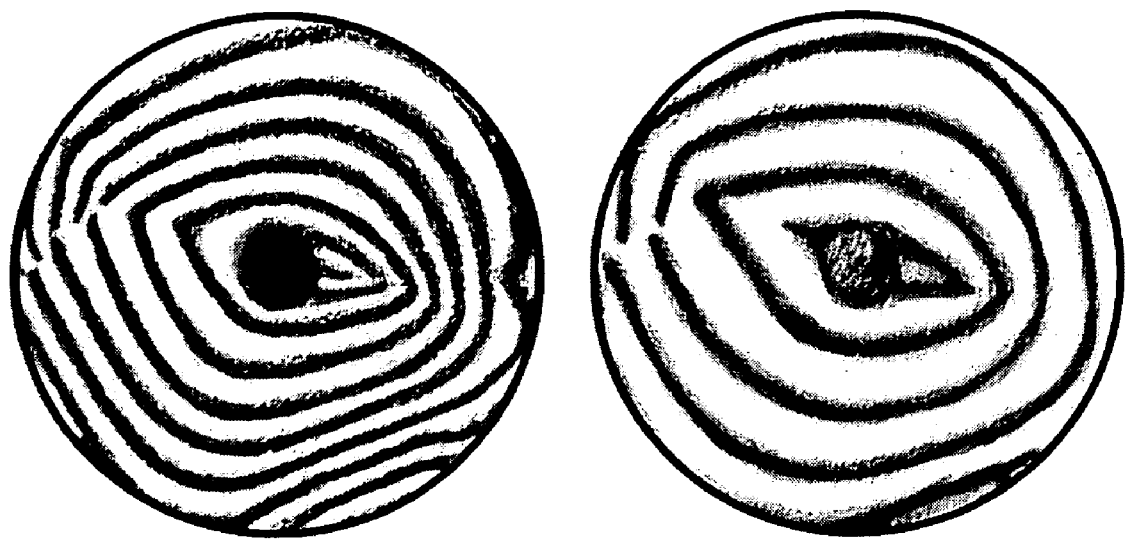
FIG. 8 shows the interference portraits of the electrode during uniform circular heating on its outer contour at different temperature influence levels.
Figure 9:
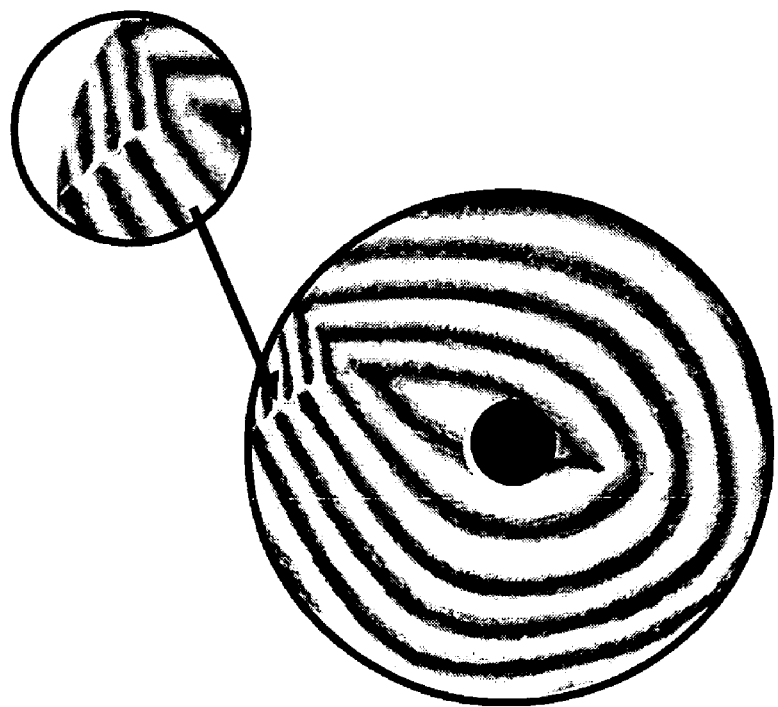
FIG. 9 shows an interference portrait of the electrode during uniform heating on its inner contour. The portion with the crack is indicated and is separated.
Figure 10:
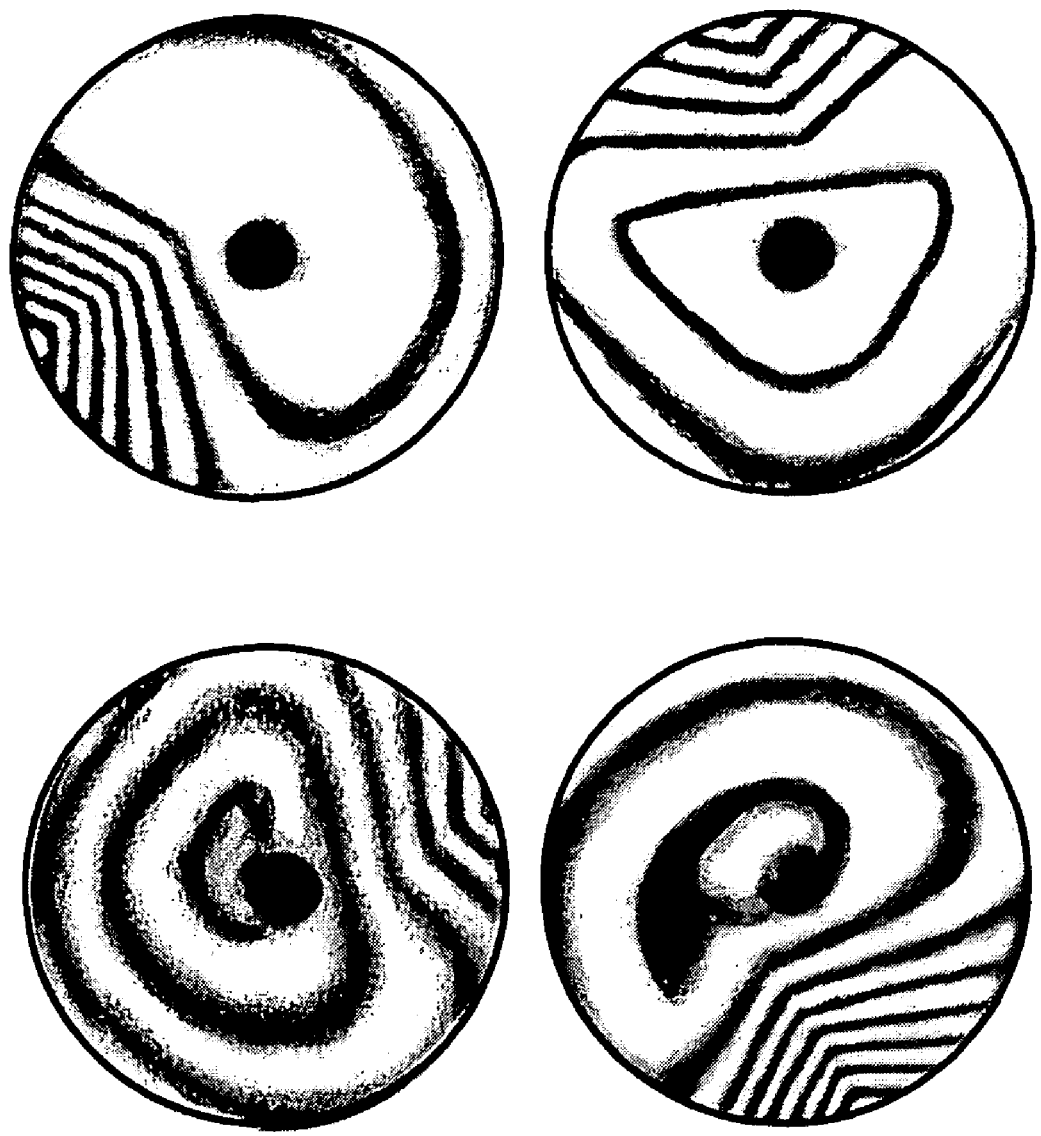
FIG. 10 shows the interference pattern portraits of the local heterogeneities along the radial axis for a solid electrolyte plate 1 with defects. The arrows show distortion zones of the interference bands that indicate locations of electrode failure. In the center, the three yellow segments of straight lines show the position of the elements used for heating of the electrodes. The increase in temperature was 2° C. The location of heterogeneities in relation the optical installation scheme changes with rotation
Figure 11:
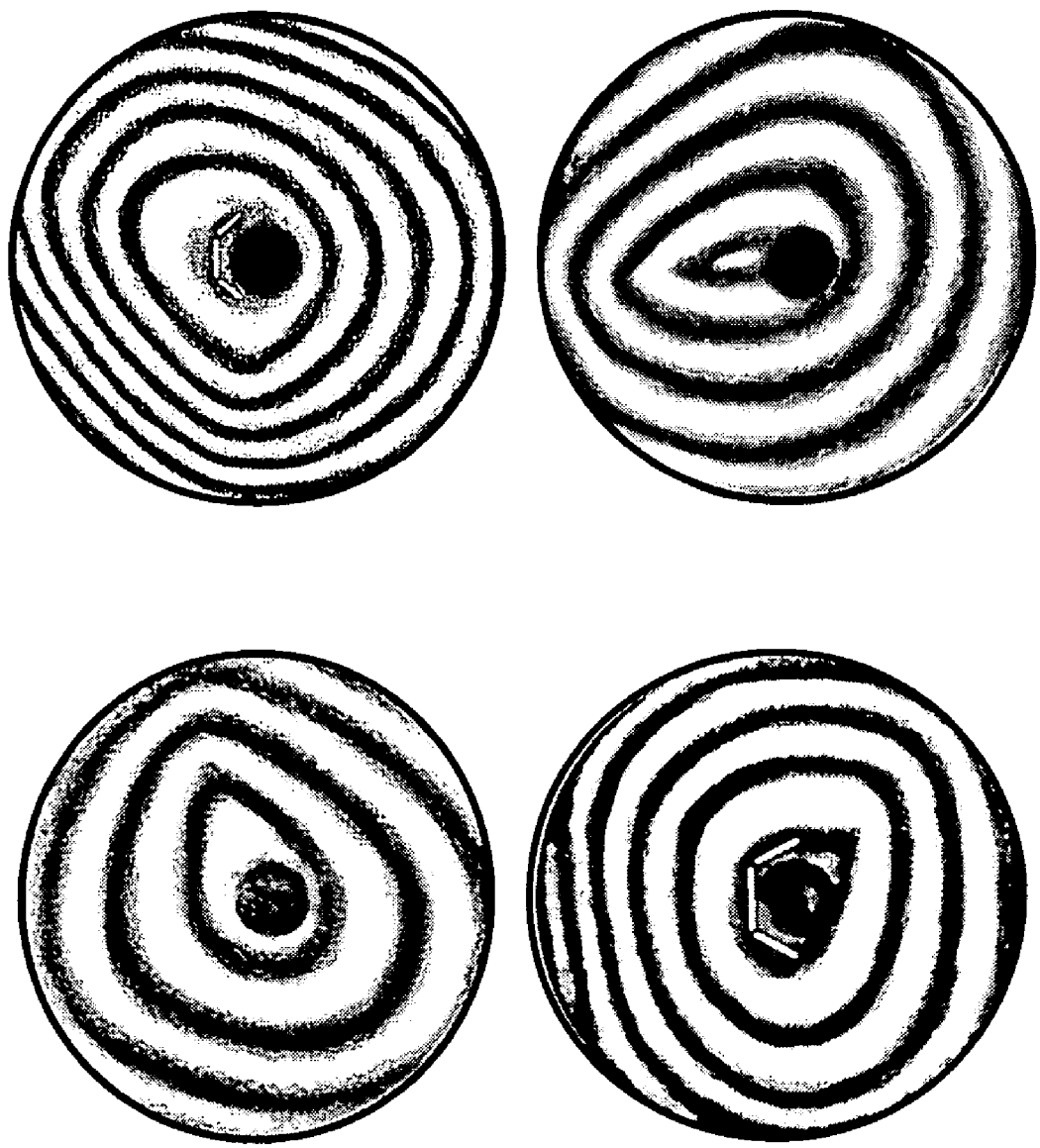
FIG. 11 shows the interference pattern portraits of the local heterogeneities along radial axis for fuel cell solid electrolyte plate #2 with defects. The arrows show distortion zones of interference bands that indicate locations of the flaws in the electrode. In the center, the three yellow segments of straight lines show the position of the elements used for heating of the electrodes. The increase in the temperature was 2° C. The location of heterogeneities in relation to the optical installation scheme changes with rotation.
Figure 12A:
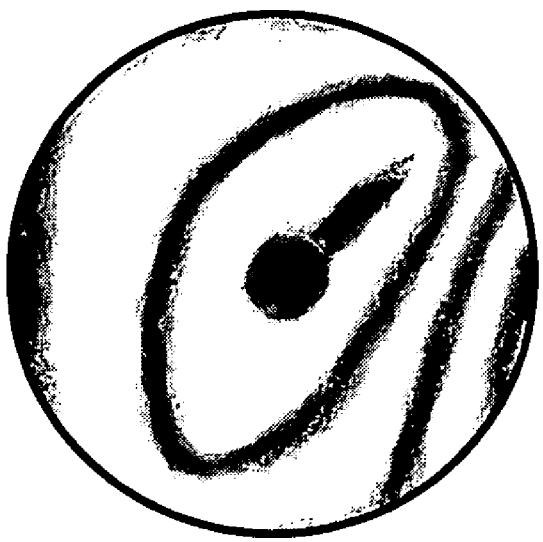
FIG. 12 shows the interference pattern portrait of local heterogeneities along the radial axis for solid electrolyte plate #2 with defects. The arrows show distortion zones of interference bands that indicate locations of electrode flaws. In the center, the three yellow segments of straight lines show the position of the elements used for heating of the electrodes. The temperature increase was 1° C. The location of heterogeneities in relation to the optical installation scheme changes with rotation FIG. 13. shows the interference pattern portrait of local heterogeneities along radial axis for solid electrolyte plate #2 with defects.
Figure 12B:
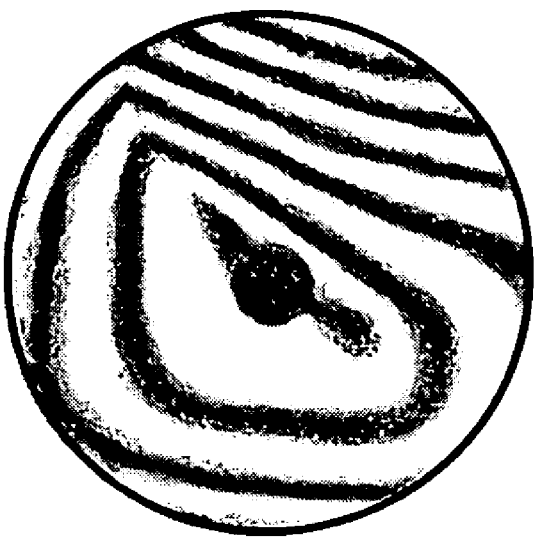
Figure 12C:
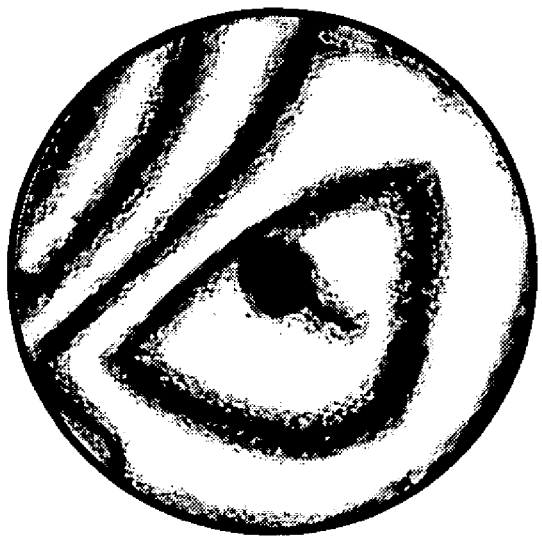
Figure 13:

To demonstrate the effectiveness of the method of the present invention, FIG. 7 shows an interference pattern portrait of a thin round plate that has intentionally created defects in the form of three radial cracks.

The holographic interference portraits were recorded on a real time scale by using a photo-thermoplastic recorder. Thus, a hologram of the heated object was obtained, whereupon, while watching through the cell of a photo-thermoplastic device the movement of the interference bands on the electrode surface, the distribution of the bands was recorded and transmitted to the computer by means of a digital camera. The use of the real time method permitted selection of the heating time at which the density of the interference bands was optimal.

Example 1

A thermal battery electrode was evaluated using holographic interferometry. A test article sample was placed in a transparent container which was filled with argon. Then the sample was exposed to local heating by 1 to 2 degrees near the inner opening. Under the influence of thermal loading there occurred temperature-induced deformations of the sample.

To control for effects of experiment conditions on test results, the container with the electrode was continuously rotated in the plane normal (90 degrees) to the installation axis, its interference portrait being registered at each revolution.

Figure 1:
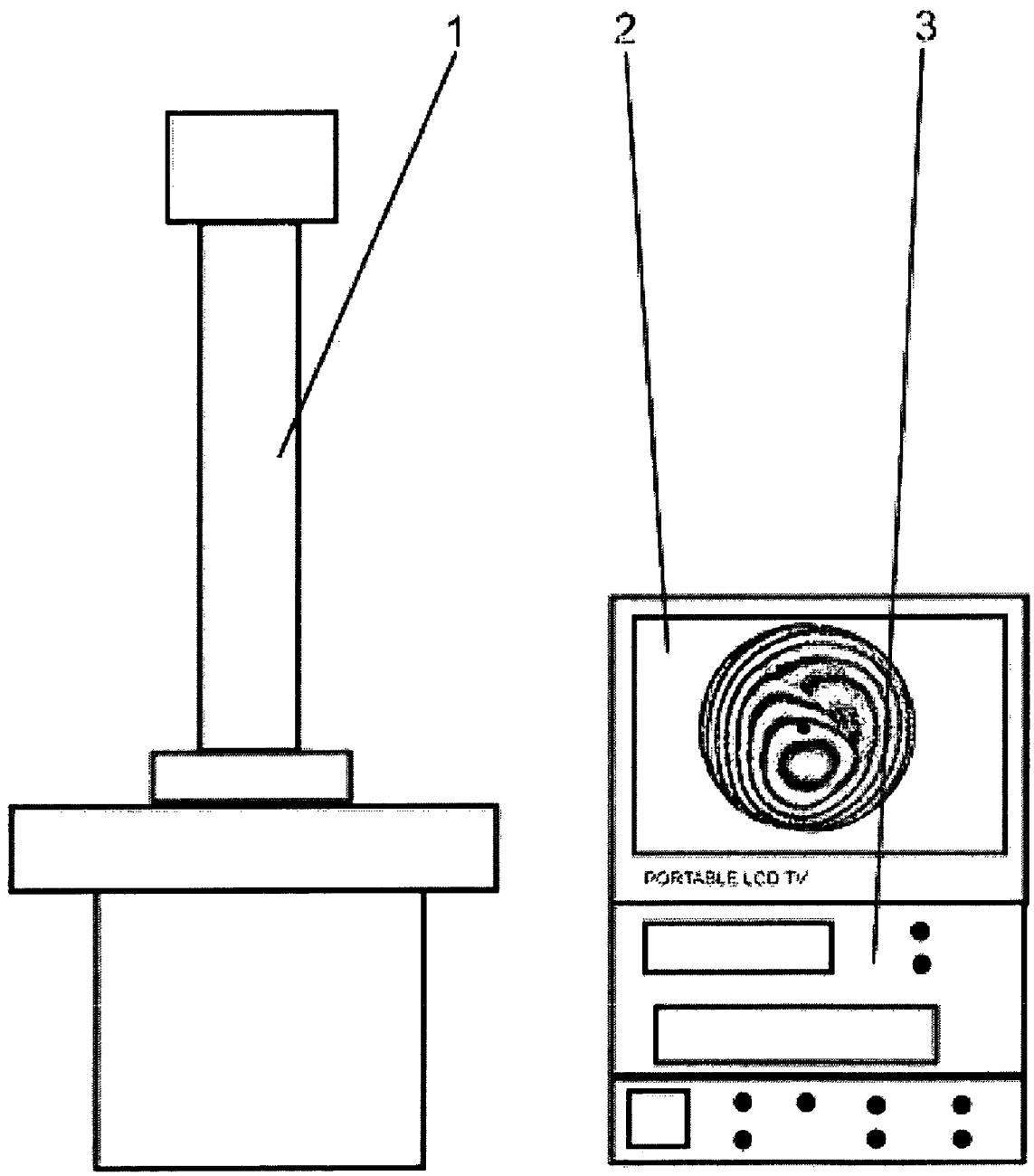
FIG. 1. shows the device for non-destructive technology based on holographic interferometry, wherein a holographic interferometer 101 is located next to a controller 103 and a monitor 102.
Figure 2:
FIG. 2 shows the interference pattern "portraits" of a stainless steel plate during the uniform heating of the interior openings.

The interference line images or "portraits" obtained are shown in FIG. 1 (*a-r*) and FIG. 2 (*a-r*). These portraits show local heterogeneities along the radial axis. The arrows show distortion zones of interference bands that indicate locations of electrode defects. In the center, the three yellow segments of straight lines show the position of the elements used for heating of the electrodes.

The location of heterogeneities in relation to the optical installation scheme changes with rotation. This fact confirms presence of, and points at the location of, heterogeneities in the electrodes being studied.

Example 2

Electrode 3 was evaluated using holographic interferometry according to the conditions described on Example 1. The interference line images or "portraits" obtained are shown in FIG. 2 (*a-r*). These portraits show local heterogeneities along the radial axis. The arrows show distortion zones of interference bands that indicate locations of defects in the electrode. In the center, three yellow segments of straight lines show spirals for heating of electrodes.

The location of heterogeneities in relation to optical installation scheme changes with rotation. This fact confirms presence of, and points at the location of, heterogeneities in the electrodes being studied.

Example 3

To control the test the method used, a stainless steel plate that had geometric dimensions similar to those of the electrodes was made and tested. The result is presented on FIG. 3.

Figure 3:
FIG. 3 shows the interference portrait of the stainless steel plate during uniform heating of the whole surface.
Figure 4:
FIG. 4 shows the interference portrait of a metallic disk with three artificial radial cracks of different lengths during uniform heating of the whole surface.
Figure 5:
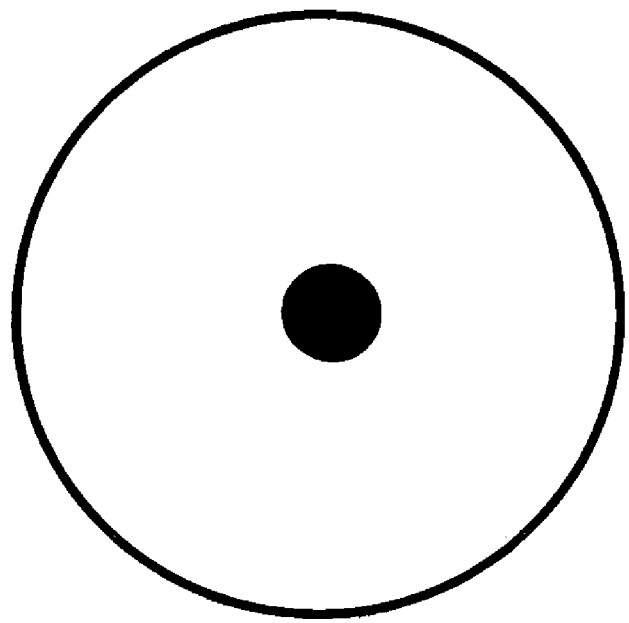
FIG. 5 is an image of sample of a plate of solid electrolyte when sample was not under thermal loading.

As shown in FIG. 3, the type of the interference bands displays gradually changing curvature that did not depend on the position of the plate in relation with the optical installation scheme. This is evidence of both the heterogeneity and isotropic properties of the test a stainless steel plate. It appears that the axially symmetric thermal loading of an object is the most effective for holographic flaw detection in circular-shape electrodes.

CLOSURE

While various embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method for detection of defects, flaws, anisotropies in a test article, said method comprising the steps of:

placing the test article in a container with a transparent window wherein the transparent window of the test articles is made of glass plate to scatter the incident light thereby providing uniform heat flow on the transparent window uniformly heating the test articles, wherein the transparent window is placed at a small angle to the horizontal plane, the angle being greater than the arc sine of the L/H relation, where L is the greatest distance between the points of registration on the test article and light diffuser, and H is the distance between a diffuser and the transparent window thereby providing reception at photo registration of the beam that is reflected from the test article and simultaneously withdraws aside a patch of light from the transparent window;

filling said container with argon;

generating a hologram of the surface of the test article;

recording said hologram by a suitable means;

sending recorded information to a computer;

thermally loading components on the test article by means of rapid heating;

generating a subsequent hologram by the said method during or after said heating;

comparing at least two of the holograms obtained to generate an interference pattern portrait, including information from at least two said holograms;

analyzing said interference pattern portrait to determine features of the said interference pattern portrait that indicate defects, flaws, anisotropies in the said test article.

2. Method as in claim 1 wherein the imparted energy of impulse heating of various components in the test article is determined by the material properties of said components.

3. Method as in claim 2 wherein a uniform thermal field simultaneously affects all areas of the test article during a short fixed time interval.

4. Method as in claim 3 wherein said heating is accomplished by a laser.

5. Method as in claim 1 wherein the heating of the individual components of the test article is controlled by one or more masks.

6. Method as in claim 1 wherein heating carried out by using an infrared lamp with the infrared energy directed through a box base wherein the test article is placed.

7. Method as in claim 1 wherein the inspection is provided based on the analysis of the dynamics of the interference bands which are moving on a surface of the test article, during the cooling of the test article and allow establishing visually both the presence of a defect, and its form and location.

8. Apparatus for non-destructive testing of power sources comprising: an optical rack; a laser; optical elements including mirrors and lenses, and optical wedge; a table; a vibration damping table; a recording cell; elastic shock-absorbers; a heating device; a case for test articles, wherein the enclosure for the test articles is made of glass plate to scatter the incident light thereby providing uniform heat flow on the enclosure uniformly heating the test articles, wherein the glass plate of the enclosure is placed at a small angle to the horizontal plane, the angle being greater than the arc sine of the L/H relation, where L is the greatest distance between the points of registration on the test article and light diffuser, and H is the distance between the diffuser and an upper plate of the enclosure and such arrangement of the plate provides reception at photo registration of the beam that is reflected from the test article and simultaneously withdraws aside a patch of light from the top and bottom sides of the upper plate of the enclosure.

9. Apparatus as in claim 8 wherein optical rack is mounted vertically providing maximal mechanical rigidity in a vertical direction, and a minimum of mutual displacement of optical elements while in service, high stability of the apparatus, and stability for recording of holograms.

10. Apparatus as in claim 8 wherein the heating device comprises an IR-lamp, enclosure for test articles, fan, vibration damped table, damper and wherein heating is carried out by directing the energy from said infra red lamp through a box base wherein the test article is placed.

11. Apparatus as in claim 8 wherein the parasitic flare of the device recording cell from a beam that is reflected from a glass transparent cover of the enclosure case is eliminated.

12. Apparatus as in claim 8 wherein the said table for mounting of the test object is rigidly affixed to the optical rack that insulates the holograms from the influence of the low-frequency vibrations is executed in the form of the horizontal plate that is supported by a rigid ring, is affixed to the elastic shock absorbers.

* * * * *